Figures 3, 4:
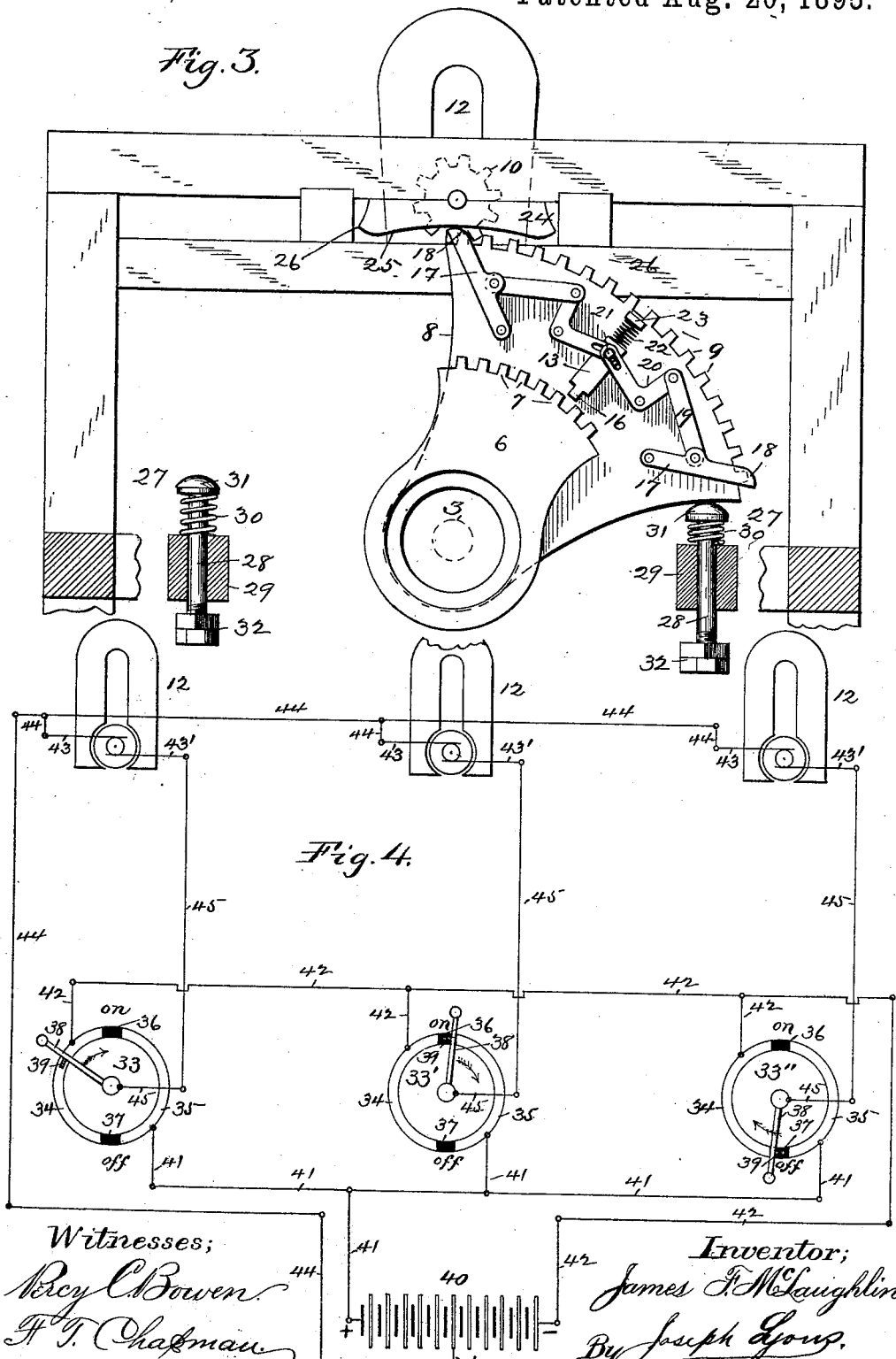

(No Model.) 2 Sheets—Sheet 1.
J. F. McLAUGHLIN.
APPLYING POWER AT A DISTANCE BY MEANS OF ELECTRICITY.
No. 544,861. Patented Aug. 20, 1895.
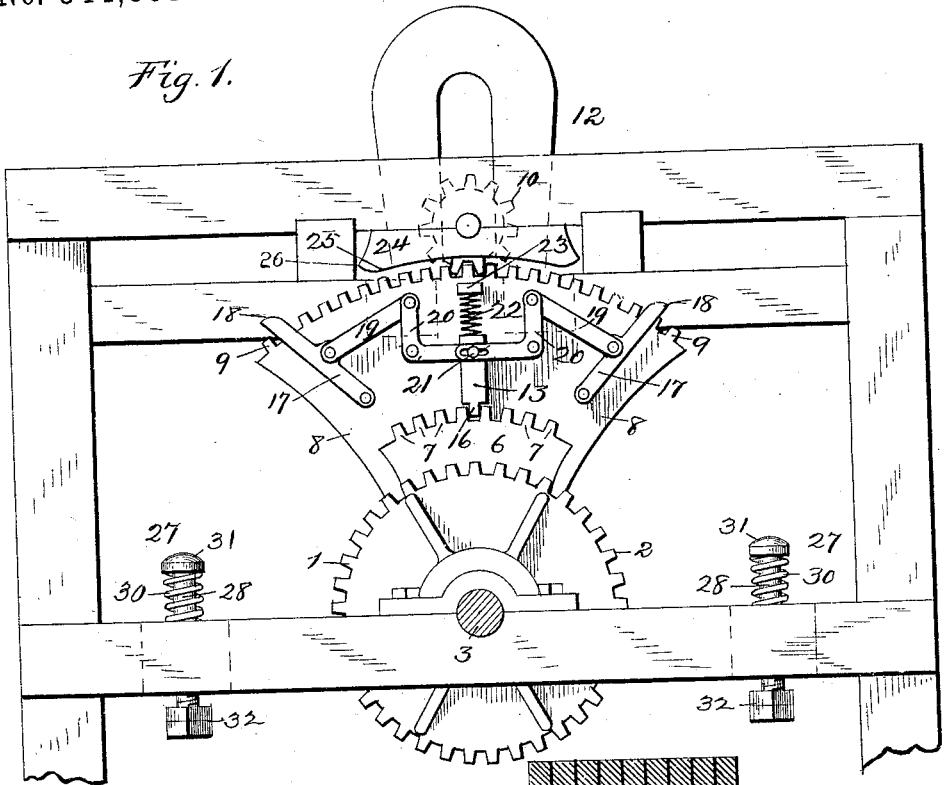
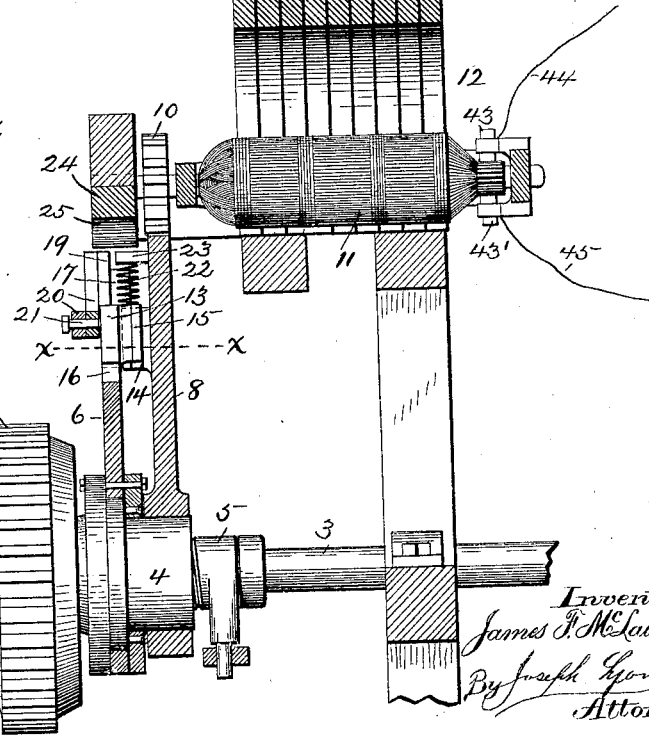
Witnesses:
Percy C. Bower
F. P. Chapman
Inventor:
James F. McLaughlin,
By Joseph Lyons
Attorney (No Model.) 2 Sheets—Sheet 2.

J. F. McLAUGHLIN.
APPLYING POWER AT A DISTANCE BY MEANS OF ELECTRICITY.

No. 544,861. Patented Aug. 20, 1895.

Witnesses;
Percy C. Bowen
F. T. Chapman

Inventor;
James F. McLaughlin,
By Joseph Lyons,
Attorney.

UNITED STATES PATENT OFFICE.

JAMES F. McLAUGHLIN, OF PHILADELPHIA, PENNSYLVANIA.

APPLYING POWER AT A DISTANCE BY MEANS OF ELECTRICITY.

SPECIFICATION forming part of Letters Patent No. 544,861, dated August 20, 1895.

Application filed October 8, 1891. Serial No. 408,145. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Applying Power at a Distance by Means of Electricity, of which the following is a specification.

My invention has reference to a construction and arrangement of apparatus whereby a superintendent or attendant in a large factory is enabled to connect machinery with the driving-power and disconnect it therefrom a considerable distance, as from the office of the superintendent, which is frequently located at one end of a large building, while the machinery is distributed all throughout the building, or the office of the superintendent may be located in a building separated and at a considerable distance from the factory. In such cases it is impracticable to connect each set of machinery with the office of the superintendent by levers and rods for operating belt shifters or clutches, and it has heretofore been the practice for the superintendent to notify an attendant stationed at a set of machinery, either by a telegraphic signal or by telephone, to start or to stop the machinery. This practice proved to be very unsatisfactory, since in some establishments it is of great importance that a set of machinery be put in operation promptly and at a moment's notice. Such is the case more particularly in electric lighting central stations where a number of dynamos are provided as relays to supply an increased demand of the system or to take the place of other dynamos, which by accident have become inoperative.

By the aid of my invention the superintendent of an electric central station can start or stop any dynamo directly from his office at a moment's notice.

In accordance with my invention the starting and stopping of a set of machinery from a distance is effected by means of an electric motor located at and suitably connected with friction-clutches, belt-shifters, throttle-valves, or other means provided for turning on and cutting off the motive power from a set of machinery. This electric motor is controlled by a simple switch located at the office of the superintendent, and is so arranged and connected with the motor and with the supply of current from the same that the said motor may be run in one direction or the other the required length of time for actuating the friction-clutch, belt-shifter, throttle-valve, or other means for turning on and cutting off the motive power.

My invention comprises the control of any number of sets of machinery from the office of a superintendent, and it requires a separate switch for each set of machinery, but only a single source of current for all of them; and the arrangement is such that the position of each switch indicates whether the set of machinery controlled by the same is connected with or disconnected from the motive power.

As stated above, my invention is applicable to the turning on and off of power by means of friction-clutches, belt-shifters, throttle-valves, &c., but for the sake of simplicity the following detailed description, with reference to the accompanying drawings, describes and illustrates my invention as applied to the control of machinery by means of friction-clutches. It will, however, be understood that my invention is not limited to this feature, and that I am not limited to the particular details of construction which I have adopted for explaining my invention.

In the accompanying drawings, Figure 1 is an elevation of an electrically-operated clutch constructed in accordance with my invention. Fig. 2 is a central section of the same with parts in elevation. Fig. 3 is an elevation similar to that shown in Fig. 1, but with parts removed and in section and with the clutch-operating mechanism at the limit of its travel in one direction. Fig. 4 is a diagrammatic view illustrating the electric circuits and connections from a central station to several clutch-operating motors controlled therefrom, and Fig. 5 is a section on line $x$ $x$ of Fig. 2.

Referring now to the drawings, there is shown in Figs. 1 and 2 a clutch 1, which may be of any suitable construction adapted to the purposes of the present invention; but it is preferably constructed in the manner fully shown and described in Letters Patent No. 451,653, granted to me on the 5th day of May, 1891. Consequently no detailed description is herein given. The clutch consists, essentially, of a gear 2, which may be connected directly to the machine to be driven or to the motive power, as may be desired. Within the gear there are clutch-shoes (not shown) mounted so as to rotate with a shaft 3, which may be either the drive or driven shaft, and these clutch-shoes are forced into or out of engagement with the gear 2 by means of a shifter 4, mounted upon a fixed screw 5, the construction being such that the expansion or contraction of the clutch-shoes is effected by partially rotating the shifter 4 in one direction or the other.

Secured to the shifter 4 and projecting therefrom at right angles to the shaft 3 there is an arm 6, with its outer end expanded and provided with gear-teeth 7, concentric with the said shaft. Journaled upon and concentric with the shifter 4 and free to partially rotate thereon is a segmental plate 8, parallel with the arm 6 and extending beyond the latter. This plate 8 has its outer edge concentric with the shaft 3 and provided with gear-teeth 9, which mesh with the teeth of a pinion 10 on the shaft of an armature 11 of an electric motor 12, which in the drawings is shown as a magneto-electric motor, but which may be replaced by any other suitable form of electric motor. Mounted on one face of the plate 8 there is a sliding block 13, held to the said plate by channeled ears 14, formed with or secured thereto, as shown in Fig. 5, and which grasp a tongue 15, projecting from one side of said block. This block 13 is movable radially on the plate, and its lower end is formed into a tooth 16, shaped to enter between any two of the teeth 7 on the outer end of the arm 6. On the face of the plate 8, near each end of the same, is a lever 17, pivoted at one end to said plate, and at the other end partially rounded, as shown at 18. Each lever 17 is connected by a link 19 to one arm of a bell-crank lever 20, also pivoted to the plate 8, the other end of each bell-crank lever 20 having a sliding pivotal connection 21 with the block 13. The block 13 is normally held with its tooth 16 between two of the teeth 7 by means of a spring 22, interposed between the upper end of the block 13 and a lug 23, projecting from the plate 8. The tendency of the spring is to force the block 13 toward the shaft 3, and through the bell-crank levers 20 and links 19 it holds the levers 17 in the positions shown in Fig. 1.

In the path of the outer ends of the levers 17 there is a block 24, with its lower edge 25 concentric with the outer edge of the plate 8, except at the ends, where it is cam-shaped—rounded away, as shown at 26. If, now, the motor-armature be caused to rotate, the plate 8, together with the arm 6, to which it is connected by the block 13, will be moved about the shaft 3 until the outer end 18 of one of the levers 17 engages the corresponding rounded end 26 of the block 24. A further movement of the plate 8 will cause the lever 17 to move on its pivot until it is sufficiently depressed to ride along the lower edge 25 of the block 24. (See Fig. 3.) The depression of the lever 17 acts, through the link 19 and bell-crank lever 20, to raise the block 13 against the action of the spring 22 (and thereby compressing the latter) until the tooth 16 is clear from the teeth 7 of the arm 6, which latter will therefore cease to move as the plate 8 continues its movement.

If the motor-circuit remains closed for a sufficient length of time, one side of the plate 8 will ultimately be brought into contact with a spring-cushion 27, which will yield until the pinion 10 runs off from the gear-teeth 9 on the outer edge of the plate 8, and the said pinion will then rotate idly until the motor-circuit is broken, when the spring-cushion will again force the teeth 9 into engagement therewith. The spring-cushion 27, as shown in the drawings, (see Figs. 1 and 3,) consists essentially of a bolt 28, free to slide vertically in suitable bearings 29 and held normally in an elevated position by means of a helical spring 30, interposed between the rounded head 31 of the said bolt and the bearings 29. The lower end of the bolt is provided with nuts 32 to prevent its being accidentally lifted from its seat. As will be readily understood, any other form of cushion may be employed. When the motor is rotated in the opposite direction the plate 8 will be moved away from the cushion, 27 with which it engaged, and as such movement is continued the lever 17 will ride from under the block 24 and the block 13 will be forced into engagement with the teeth 7 of the arm 6 and cause the latter and the plate 8 to move in unison until the other arm 17 is brought into contact with and rides under the block 24, when the block 13 will be again raised in the manner before described, and the arm 6 will be again disconnected from the plate 8 and the latter will continue to move until the motor-circuit is broken or it is brought into contact with another cushion 27.

The construction is such that when the plate 8 and arm 6 are moved in one direction the clutch-shoes of the clutch are moved into engagement with the gear 2, and the mechism is so timid that when the clutching action is firmly established the arm 6 is disconnected from the plate 8, and when the latter is moved in the opposite direction the arm 6 is again engaged and moved with the said plate until the clutch-shoes are carried away from the gear 2 sufficiently to release the same by the time when the arm 6 is again disconnected from the plate 8. It will now be understood that in the normal condition of the apparatus the segmental plate 8 is at the end of its path, either to the right or to the left, with the tooth 16 of the block 13 out of engagement with the teeth 7 on the arm 6. Consequently when the electric motor is started there is practically no load on the same. It can therefore start promptly and with little current, and by the time the tooth 16 engages one of the teeth 17, whereby the load is placed upon the motor, the latter will have attained a considerable speed, and will thus be able to move the clutch with ease.

As hereinbefore stated, my invention is not confined to the control of motive power by means of friction-clutches, and it will now be understood that the arm 6 may be connected with a belt-shifter, or this arm may be fast on the shaft 3, in which case the shaft may be the spindle of a throttle-valve for turning on and cutting off steam, water, or compressed air; but since all these variations are so simple as to suggest themselves spontaneously to persons skilled in the art it is not necessary to describe the same.

In Fig. 4 the equipment of a superintendent's office with switches for controlling a number of electric motors which in turn control the application of motive power in accordance with my invention is illustrated.

The electric motors 12 may be provided with permanent field-magnets, as shown, or the field-magnets may be separately and constantly energized—that is to say, the motors may be of the kind known as "magneto-electric motors," as shown, or they may be of the type known as "electromagnetic motors." In either case a simple reversal of the actuating-current reverses the direction of the rotation. Dynamo-electric motors, especially of the shunt-wound type, may also be used, but in that case the circuit connections for reversing the motors would be somewhat complex, and for this reason I prefer to use simple magneto-electric motors of the kind shown, which for the purposes of my invention are sufficiently powerful.

In the drawings I have shown three electric motors 12 12' 12'', which will be understood as being located each in operative relation to a clutch, belt-shifter, or throttle-valve, as hereinbefore described. In the superintendent's office are mounted the switches 33 33' 33'', each corresponding to one electric motor. These switches are composed each of two metallic segmental contact-plates 34 35, separated from each other by short segments 36 37 of insulating material and forming a complete annulus with the same, and of a switch-arm 38, provided with a trailing contact-brush 39, which, when the switch-arm is turned in the direction of the hand of a clock, as indicated by an arrow, bears successively upon the contact-plates and upon the insulating-plates.

Provision should be made to prevent the turning of the switch-arms in an opposite direction; but the means used for such purpose being so common and well known it is not deemed necessary to illustrate the same.

The source of current for operating the motors I have illustrated conventionally as a battery 40, composed of a number of cells coupled in series. The positive pole of the battery is connected with each of the contact-segments 35 of the switches by conductors 41, and the negative pole of the battery is connected with each of the contact-segments 34 by conductors 42. The middle of the battery is connected with one commuator-brush 43 of each electric motor by conductors 44, while each switch-arm is connected with the second commutator-brush 43' of a corresponding electric motor by conductors 45.

The operation of the system will now be readily understood. When the switch-arm of one of the switches is in the position in which the contact-brush bears upon an insulating-segment, the circuit to the corresponding motor is interrupted. Such is the case in the illustrated condition of the switch 33''; but when the switch is moved from that position in the direction of the arrow, (and it cannot be moved in the other direction,) as indicated on the switch 33, the contact-brush 39 bears upon the segment 34 and the circuit to the corresponding motor is closed, as follows: from the positive pole of the right-hand section of the battery, by conductors 44, to commutator-brush 43, through the armature, commutator-brush 43', conductors 45, switch-arm 38, contact-brush 39, segment 34, and conductors 42, back to the negative pole of the battery. During the passage of the switch-arm over contact-segment 34 the motor is actuated and the arrangement is such that it is actuated to apply the clutch in the manner hereinbefore described, or to shift a belt or open a throttle-valve, and by the time the switch-arm arrives at the position indicated on switch 33' the toothed sectoral plate 8 should have arrived at the position indicated in Fig. 3. The switch-arm must therefore be turned slowly, so that its travel over segment 34 shall occupy about half a minute. It is, however, not necessary that it be moved uniformly so long as its passage from end to end occupies the required time or more. When the switch-arm arrives in the position indicated on switch 33', with its brush 39 bearing upon insulation 36, the circuit to the motor is interrupted and the operator knows that the power has been turned "on." When it is desired to turn the power "off," it is only necessary to turn the switch-arm on and over the segment 35, whereby the current to the motor is again turned on, but reversed, as follows: from the positive pole of the whole battery, by conductors 41, switch-segment 35, switch-arm 38, conductors 45, to commutator-brush 43', then through the armature of the motor out by brush 43, and by conductors 44 back to the negative pole of the left-hand section of the battery. The motor being thus reversed, the clutch or other device controlled by the same is turned off, and when the switch-arm arrives in the position indicated on switch 33'' the circuit is again broken by the brush 39 bearing upon the insulation 37 and the operator knows that the power has been turned off. The words "on" and "off" may be marked on each switch in the positions indicated, although this is not absolutely necessary.

Having now fully described my invention, I claim and desire to secure by Letters Patent—

1. The combination with sets of machinery driven by a suitable power and a power controlling device one for each set, for applying and for cutting off the motive power from said machinery, of a number of reversible electric motors, one for each power controlling device, for actuating the same in two directions, a split battery for charging the motors, and a reversing switch for each motor, substantially as described.

2. The combination of a mechanical power controlling device and an electric motor for actuating the same; with a coupling between the motor and power controlling device, automatically connecting and disconnecting the same, and timed to engage the latter after the former has started without load, substantially as described.

3. In a system for controlling the application of power from a distance, the combination of a mechanical power controlling device and a reversible electric motor for actuating said device in two directions, a coupling between the motor and the power controlling device, and a system of levers timed to uncouple the motor from the said devices after the latter has been actuated in either direction, substantially as described.

4. In a system for controlling the application of power from a distance, the combination with a clutch, of a reversible electric motor for actuating the said clutch in two directions, a coupling between the motor and clutch, and a system of levers timed to uncouple the motor and clutch after the latter has been actuated in either direction, substantially as described.

5. The combination with a clutch, of an electric motor for actuating the same, a toothed sector driven by the motor a system of levers carried by said sector, a coupling between the sector and clutch, actuated by the system of levers, and a curved block in the path of the lever system, for operating them to disconnect the sector and clutch after the clutch has been actuated in either direction, substantially as described.

In testimony whereof I have signed my name to this specification in the presence of two subscribing witnesses.

JAMES F. McLAUGHLIN.

Witnesses:
W. C. McCURDY,
H. F. REARDON.